April 16, 1940. E. E. WARNER 2,197,139
PUPILLOMETER
Filed May 27, 1939
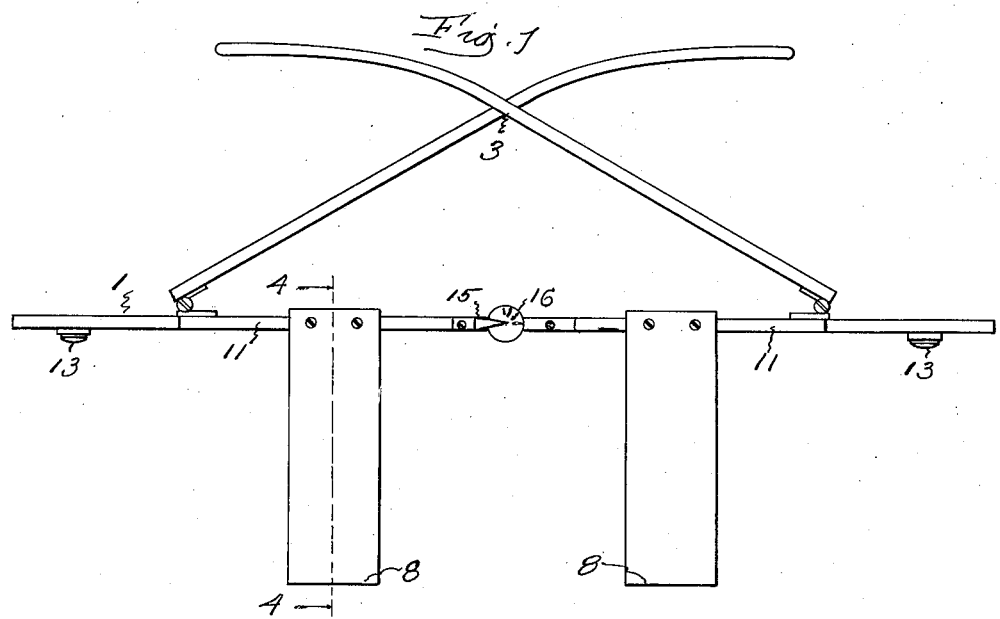
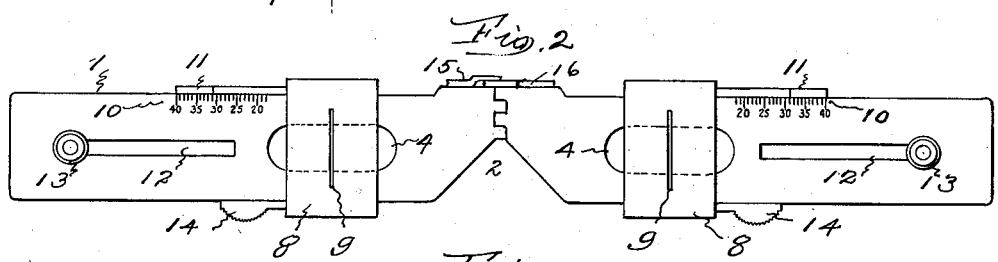
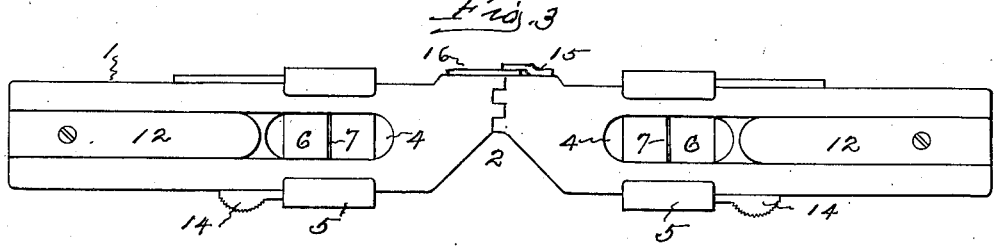
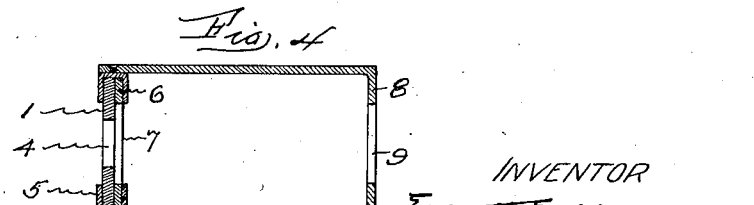
INVENTOR
Everett E. Warner
by Harry P. Williams
atty.

Patented Apr. 16, 1940

2,197,139

UNITED STATES PATENT OFFICE 2,197,139

PUPILLOMETER

Everett E. Warner, East Hartford, Conn.

Application May 27, 1939, Serial No. 276,246

6 Claims. (Cl. 33—200)

This invention relates to a pupillometer, that is, an instrument designed to be used by an optician for ascertaining the pupillary distance of the eyes of a person.

The object of the invention is to provide a very simple and inexpensive instrument which may be easily and quickly manipulated so as to disclose the exact distance between the centers of the pupils of the eyes being measured at infinite or focal distances.

The embodiment of the invention has means for retaining the instrument on the head of a person in front of the eyes to be measured, and slitted screens which are movable either parallel or obliquely with relation to each other before the eyes so that beams of light passing through the slits and the centers of the pupils of the eyes may be collimated and thereby the pupillary distance of the eyes indicated by the interval of separation of the light beams.

In the accompanying drawing

Fig. 1 shows a top view of the instrument.

Fig. 2 shows a front view of the instrument.

Fig. 3 shows a rear view of the instrument with the retaining bows omitted.

Fig. 4 shows a transverse section on the plane indicated by the dotted line 4—4 on Fig. 1.

The instrument illustrated has a bridge plate 1 which may be made of metal, plastic or other desired material. The plate is hinged at the middle of its length allowing the sections to be set in alignment or at an angle with each other. At the axis one section has a pointer 15 and the other has index marks 16 for indicating the relative position of the sections. The plate has a recess 2 shaped to allow the plate to rest easily upon the nose of the person whose pupillary distance is to be measured. Pivoted to the rear side of the plate are bows 3 made of common material and shape for engaging the head of the person and retaining the plate in position in front of the eyes.

Each section of the plate has a sight-opening 4 and mounted on and movable longitudinally on the plate in front of each sight-opening is a forwardly extending slide 5. Close to the plate each slide has an opaque screen 6 with a thin vertical slit 7 and spaced from the plate each slide has an opaque screen 8 with a thin vertical slit 9 that aligns with the slit 7. On the front face of the plate adjacent to each slide is a scale 10, and projecting from each slide is an arm 11 with an index line that is adapted to register with the scale and indicate the position of the slide on the plate.

Movable back and forth in a channel on the rear of the plate are shutters 12 which when slid to one position close the sight-openings through the plate and when moved to another position will expose those openings. These shutters may be provided in front of the plate with operating knobs 13 the stems of which extend through slots in the plate, and the slides provided with finger pieces 14 by means of which they may be conveniently moved.

In using this instrument the plate is set with the sections in alignment or at angles, depending upon the focal distance to be measured, and is placed upon the nose and held in position by the bows. One sight-opening in the plate is closed by a shutter. The slide that is not cut off is slid back and forth on the plate until a vertical beam of light is seen by the patient. This slide is moved first one way until the beam of light is cut off and a reading is taken from the scale. It is then moved in the opposite direction until the beam of light is cut off and a reading taken from the scale. One-half of the distance between the two readings will be the exact center of the pupil of the eye on that side from the middle of the plate. The shutter on this side is then closed and the shutter on the other side opened, and the same steps of manipulation are taken to obtain a reading of the distance of the exact center from the middle of the plate of the pupil of the eye on that side. The sum of the readings of the pupils from the middle of the plate will be the exact pupillary distance at the focal distance desired of the eyes being measured.

By the use of this simple instrument which collimates the two beams of light on each slide with the pupils the exact centers of the pupils and their pupillary distance can be easily, quickly and accurately obtained.

The invention claimed is:

1. A pupillometer comprising a bridge plate with sight-openings and means for temporarily locating and holding the plate in position with the sight-openings in front of the eyes to be measured, means having vertical slits aligned one in front of the other for collimating beams of light and the pupils of the eyes movable on the plate in front of each sight-opening, shutters for shutting off the sight-openings, and scales to indicate the distance apart of said collimating means.

2. A pupillometer comprising a bridge plate with sight-openings and means for temporarily locating and holding the plate in position with the sight-openings in front of the eyes to be measured, said plate being hinged at the middle of its length, opaque spaced apart screens with aligned slits attached to and movable together along the front of each section of said plate to collimate said slits and the pupils of the eyes, shutters for shutting off the sight-openings, and scales to indicate the position of said screens on the plate.

3. A pupillometer comprising a sectional bridge plate with sight-openings and means for temporarily locating and holding the plate in position with the sight-openings in front of the eyes to be measured, the sections of said plate being hinged together and provided with means for indicating their hinged relation, a slide with opaque spaced apart screens that have aligned slits, movable in front of each sight-opening, shutters for shutting off the sight-openings, and scales to indicate the position of the slides on the plate.

4. A pupillometer comprising a sectional bridge plate with sight-openings and means for temporarily locating and holding the plate in position with the sight-openings in front of the eyes to be measured, each section of said plate having in front of a sight-opening a slide with an opaque screen adjacent to the plate and an opaque screen at a distance in front of the plate, said screens having aligned slits, and shutters for shutting off the sight-openings.

5. A pupillometer comprising a bridge plate formed of hinged sections with sight-openings and means for retaining the plate in position in front of the eyes to be measured, means attached to and movable along said plate, said means having two opaque screens with aligned slits movable in front of each sight-opening, shutters for cutting off the sight-openings, and scales for indicating the angular relation of and interval between the slits of the screens.

6. A pupillometer comprising a bridge plate formed of hinged sections and provided with sight-openings and means for temporarily retaining the plate in position in front of the eyes to be measured, means comprising two opaque screens spaced one in front of the other with aligned vertical slits, attached to and movable along the front of said plate, and shutters for shutting off the sight-openings.

EVERETT E. WARNER.